(12) United States Patent
DeSellem et al.

(10) Patent No.: US 9,482,428 B2
(45) Date of Patent: Nov. 1, 2016

(54) DUAL PHASE FUEL FEEDER FOR BOILERS

(71) Applicant: Babcock & Wilcox Power Generation Group, Inc., Barberton, OH (US)

(72) Inventors: James F DeSellem, Salineville, OH (US); Karl M Heil, North Canton, OH (US); Jeremiah J Yoder, Monroe, NC (US); Albert D LaRue, Uniontown, OH (US); Mikhail Maryamchik, Fairlawn, OH (US); William R Stirgwolt, Wadsworth, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 459 days.

(21) Appl. No.: 14/246,683

(22) Filed: Apr. 7, 2014

(65) Prior Publication Data
US 2014/0305357 A1    Oct. 16, 2014

Related U.S. Application Data

(60) Provisional application No. 61/810,960, filed on Apr. 11, 2013.

(51) Int. Cl.
| | |
|---|---|
| *F23B 50/12* | (2006.01) |
| *F23G 5/00* | (2006.01) |
| *F23K 3/02* | (2006.01) |
| *F23G 5/44* | (2006.01) |
| *F23C 1/06* | (2006.01) |
| *F23C 1/04* | (2006.01) |
| *F23C 1/02* | (2006.01) |
| *F23C 10/22* | (2006.01) |
| *B65G 11/00* | (2006.01) |
| *F23C 1/10* | (2006.01) |
| *F23G 5/30* | (2006.01) |

(52) U.S. Cl.
CPC ............... *F23B 50/12* (2013.01); *F23C 1/02* (2013.01); *F23C 1/04* (2013.01); *F23C 1/06* (2013.01); *F23C 1/10* (2013.01); *F23C 10/22* (2013.01); *F23G 5/008* (2013.01); *F23G 5/442* (2013.01); *F23G 5/444* (2013.01); *F23K 3/02* (2013.01); *B65G 11/00* (2013.01); *F23G 5/30* (2013.01); *F23G 2205/16* (2013.01); *F23G 2205/20* (2013.01); *F23G 2900/50007* (2013.01); *F23K 2201/501* (2013.01); *F23K 2203/201* (2013.01)

(58) Field of Classification Search
CPC .............. F23K 3/00; F23K 3/02; F23K 3/16; F23K 3/18; F23K 2203/201; F23K 1/02; F23K 2201/501; F24B 13/04; F23B 50/12; F23G 5/444; F23G 2205/00; F23G 2205/16; F23G 2205/20; F23G 5/008; B65G 11/00
USPC ......................................................... 193/2 R
See application file for complete search history.

(56) References Cited

U.S. PATENT DOCUMENTS

| | | | | |
|---|---|---|---|---|
| 1,973,697 A | * | 9/1934 | Bailey ........................ | F23G 5/08 110/259 |
| 5,052,310 A | * | 10/1991 | Goff ....................... | F22B 31/045 110/103 |

(Continued)

*Primary Examiner* — David J Laux
(74) *Attorney, Agent, or Firm* — Eric Marich

(57) ABSTRACT

A dual phase fuel feeder is disclosed that can be used to provide both solid fuels and liquid fuels to a boiler, such as a fluidized bed boiler. The fuel feeder includes a sloped chute which defines a solid feedpath. Gas distribution nozzles are located at the base of the fuel feeder, and secondary nozzles are located so as to be able to distribute a liquid or particulate fuel into the solid feedpath. This permits the liquid fuel to contact the solid fuel and be carried into the fluidized bed instead of becoming suspended above the bed.

35 Claims, 10 Drawing Sheets

(56) References Cited

U.S. PATENT DOCUMENTS 5,829,368 A * 11/1998 Cote ............... F23C 10/22 110/101 CF
8,276,528 B1 * 10/2012 Higgins ............... F23C 9/00 110/104 R
2007/0151491 A1 * 7/2007 Brown ............... F23D 1/00 110/110

* cited by examiner

DUAL PHASE FUEL FEEDER FOR BOILERS

CROSS-REFERENCE TO RELATED APPLICATIONS

This application claims priority to U.S. Provisional Application Ser. No. 61/810,960, filed Apr. 11, 2013 entitled "Dual Phase Fuel Feeder For Boilers". U.S. Provisional Application Ser. No. 61/810,960, filed Apr. 11, 2013 entitled "Dual Phase Fuel Feeder For Boilers" is incorporated by reference herein in its entirety.

BACKGROUND

The following relates to combustion of waste products, biomass materials, and other combustible materials, and to a fuel feeder for feeding such products or materials into a fluidized bed boiler, such as a bubbling fluidized bed (BFB) or circulating fluidized bed (CFB) boiler, or for a stoker-fired unit, and to fluidized bed boilers for combusting such products and materials which employ such a feeder, and to related arts.

During combustion, the chemical energy in a fuel is converted to thermal heat inside the furnace of a boiler. The thermal heat is captured through heat-absorbing surfaces in the boiler to produce steam. Fuels used in the furnace include a wide range of solid, liquid, and gaseous substances. Combustion transforms the fuel into a large number of chemical compounds. In some applications, solid biomass waste byproducts are used as fuel for the fluidized bed boiler.

Fluidized bed boilers are one way to burn solid fuels. Generally speaking, a fluidized bed boiler includes a bed formed from a stacked height of solid particles. A fluidization gas distribution grid, such as an open bottom system or a flat floor system, is located beneath the bed. An open bottom system is characterized by widely spaced distribution ducts on which are mounted air bubble caps for distributing fluidizing gas (typically air) under pressure to fluidize the bed. In a flat floor system, the distribution ducts form the floor of the boiler. At sufficient gas velocities, the solid particles exhibit liquid-like properties.

With reference to FIG. 1, an illustrative bubbling fluidized-bed (BFB) boiler 8 of a known design (available from Babcock & Wilcox Power Generation Group, Barberton, Ohio, USA) includes a bubbling bed 10 onto which fuel 12 is delivered via a feeder 14 comprising an air-swept spout. The fluidized bed 10 suitably comprises solid particles such as, for example, sand. A gas-tight furnace flue (only the lower portion of which is shown in FIG. 1) includes gas-tight water cooled walls 16, 17. Air is introduced into the bubbling bed 10 through air ducts 18, and spaced-apart bubble caps 20 facilitate removal of large tramp material. In an underbed ash removal system 22, tramp material moves downward and cools before being removed through bottom hoppers 24 onto a suitable conveyor system or the like (not shown). Heat from combustion on the fluidized bed 10 heats water in the gas flue wall pipes 16, 17 which may drive a steam generator or other useful work. In some embodiments water in the gas flue pipes 16, 17 flows in a closed-loop recirculation path (usually including a make-up water line). The illustrative BFB boiler 8 of FIG. 1 is merely an example, and the disclosed feeder systems and other disclosed aspects are readily incorporated into fluidized bed boilers of various designs, such as BFB and CFB designs, stoker-fired units, or so forth. In some embodiments, the feeder 14 may pass through a non-water cooled refractory furnace wall (e.g., a brick furnace wall) rather than through tube wall 16 as in the illustrative embodiment of FIG. 1, or through any other type of boiler wall. It is contemplated for the furnace wall through which the feeder 14 passes to include additional features such as thermal insulation material, an outer casing, or so forth.

Such boilers can process a wide range of waste materials, including wood waste, bark, paper mill sludge, recycled paper, sewage sludge, and various biomass materials such as stillage left over from corn (or other biomass) ethanol production. For BFB boiler operation, the feeder 14 should deliver the fuel 12 to the bed 10 without being burned in suspension. This is relatively straightforward to achieve for solid fuel, but is more difficult to achieve with liquid fuel, especially if it is atomized to increase its surface area. An existing approach for processing liquid waste is to incorporate it into solid waste prior to delivery of the liquid/solid mixture to the BFB boiler. However, this approach complicates material handling as the wet mixture can be difficult to move and handle. Another existing approach is to inject the liquid directly into the bubbling bed, typically from the floor. This approach can generate non-uniform concentrations and chemistry over the bed, which can lead to agglomeration of the bed material.

It would be desirable to provide the ability to use multiple fuel sources in a boiler, particularly a fluidized bed boiler. This would expand the range of fuels that could be used.

BRIEF DESCRIPTION

In some illustrative embodiments disclosed herein, a fuel feeder includes a sloped chute having a base configured to connect with a boiler, gas distribution nozzles configured to inject gas into the base with the injected gas oriented to propel solid fuel fed into the sloped chute into a boiler to which the base of the sloped chute is connected, and secondary nozzles different from the gas distribution nozzles and configured to inject fluid to mix with solid fuel after the solid fuel is fed into the sloped chute. In some embodiments a liquid or particulate fuel source is connected with the secondary nozzles to configure the secondary nozzles to inject liquid or particulate fuel to mix with solid fuel after the solid fuel is fed into the sloped chute. In some embodiments the secondary nozzles comprise atomizer nozzles. In some embodiments the secondary nozzles are arranged to inject fluid to mix with the gas injected into the base by the gas distribution nozzles. In some embodiments the secondary nozzles are disposed above the gas distribution nozzles and are configured to inject fluid into the sloped chute. In some embodiments the secondary nozzles are configured to inject fluid into the base of the sloped chute. In some embodiments the secondary nozzles are configured to inject fluid into the gas distribution nozzles. In some embodiments secondary nozzles are disposed below the gas distribution nozzles and are configured to inject fluid into the base of the sloped chute. A plate may be disposed in the base and arranged to separate gas injected into the base of the sloped chute by the gas distribution nozzles from fluid injected into the base of the sloped chute by the secondary nozzles.

In some illustrative embodiments disclosed herein, an apparatus includes a fuel feeder as set forth in the immediately preceding paragraph, and a fluidized-bed boiler to which the base of the sloped chute of the fuel feeder is connected. The fluidized-bed boiler includes a bed onto which the connected fuel feeder is configured to dispose solid fuel that is fed into the sloped chute and mixed with fluid injected by the secondary nozzles.

In some illustrative embodiments disclosed herein, a method comprises: feeding solid fuel into a sloped chute connected with a boiler; concurrently with the feeding, injecting a propulsion gas into a base of the sloped chute to propel the solid fuel fed into the sloped chute over a bed of the boiler; and concurrently with the feeding and the injecting of the propulsion gas, injecting a second fluid which is different from the propulsion gas to mix the second fluid with the solid fuel after the solid fuel is fed into the sloped chute. In some embodiments the second fluid is injected into the sloped chute. In some embodiments the second fluid is injected into gas distribution nozzles used to perform the injecting of the propulsion gas. In some embodiments the second fluid comprises a liquid or particulate fuel. In some embodiments the second fluid comprises a byproduct of ethanol production. In some embodiments the injecting of the propulsion gas and the injecting of the second fluid cooperatively operate to mix the propulsion gas and the second fluid. In some embodiments the method further comprises operating the boiler to combust the solid fuel that is fed into the sloped chute, mixed with the second fluid and propelled over the bed of the boiler by the injected propulsion gas. In these embodiments, the operating of the boiler may also combust the second fluid mixed with the solid fuel that is propelled over the bed of the boiler.

In some illustrative embodiments disclosed herein, a dual phase fuel feeder comprises: a sloped chute having a top end and a bottom end, the bottom end being proximate to a base of the fuel feeder, the chute defining a solid feed path; gas distribution nozzles located at the base of the fuel feeder for directing a gas into the solid feed path; and secondary nozzles placed so as to be able to direct a liquid, gas, or particulate into the solid feed path. In some embodiments the secondary nozzles are placed between the bottom end of the sloped chute and the gas distribution nozzles. In some embodiments a plate defines the base of the fuel feeder, and the plate may optionally be located between the gas distribution nozzles and the secondary nozzles. In some embodiments the secondary nozzles are rotatable so that the angle at which the liquid or particulate is directed can be changed. In some embodiments the secondary nozzles feed into the gas distribution nozzles. In some embodiments the secondary nozzles are located proximate the top end of the sloped chute. In some embodiments the secondary nozzles can be fed separately by a volatile liquid source and by a water source. In some embodiments the secondary nozzles are arranged in a staggered pattern relative to the gas distribution nozzles.

BRIEF DESCRIPTION OF THE DRAWINGS

The following is a brief description of the drawings, which are presented for the purposes of illustrating embodiments disclosed herein and not for the purposes of limiting the same.

DETAILED DESCRIPTION

Figure 1:
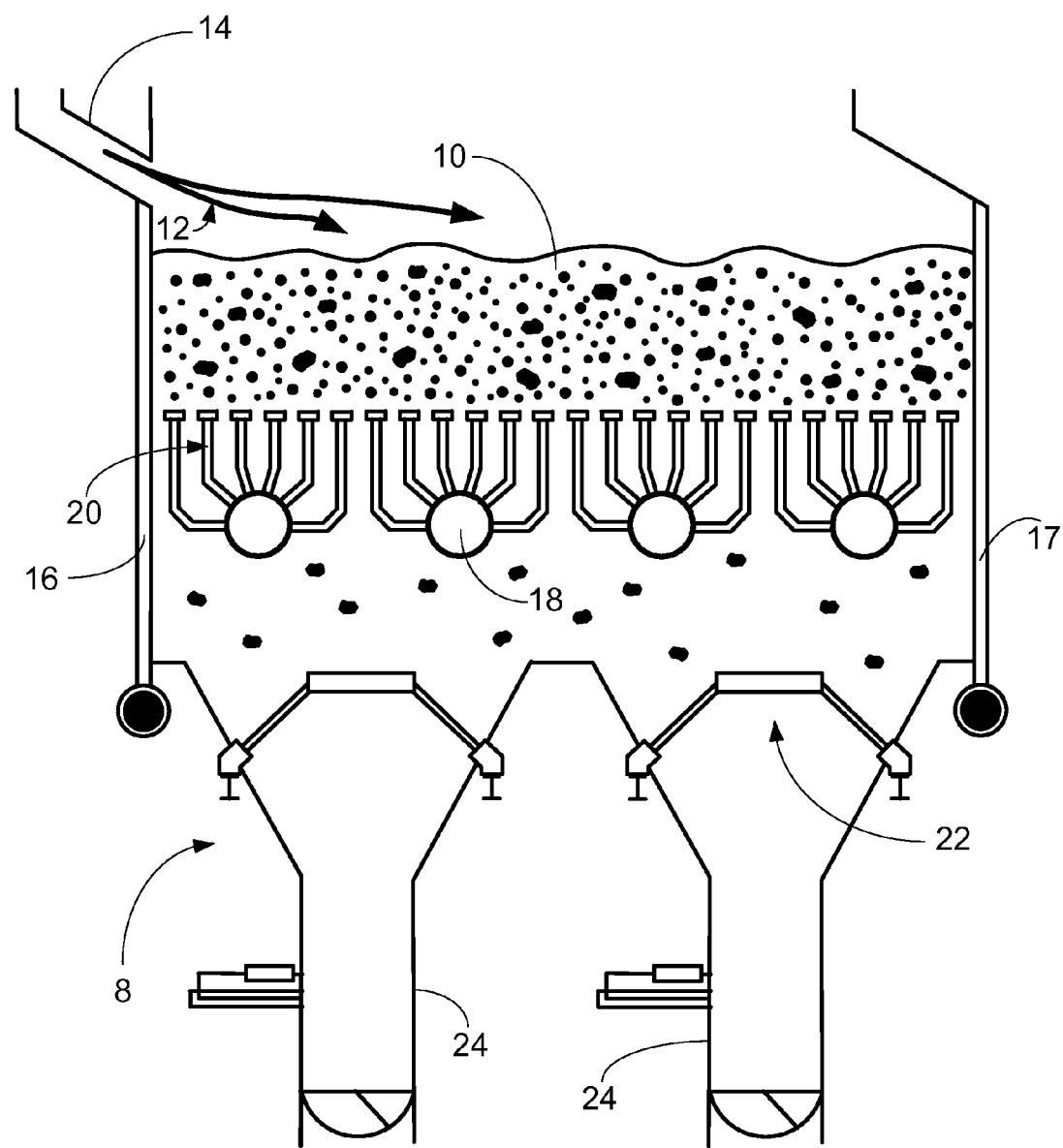
FIG. 1 diagrammatically shows an illustrative bubbling fluidized-bed (BFB) boiler of a known design.

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing compositions or processes as "consisting of" and "consisting essentially of" the enumerated components/steps, which allows the presence of only the named components/steps, and excludes other components/steps.

All ranges disclosed herein are inclusive of the recited endpoint and independently combinable (for example, the range of "from 2 watts to 10 watts" is inclusive of the endpoints, 2 watts and 10 watts, and all the intermediate values). Numerical values should be understood to include numerical values which are the same when reduced to the same number of significant figures and numerical values which differ from the stated value by less than the experimental error of conventional measurement technique of the type described in the present application to determine the value.

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

Some of the terms used herein are relative terms. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the fluids flow through an upstream component prior to flowing through a downstream component. It should be noted that in a loop, a first component can be described as being both upstream of and downstream of a second component.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" and "downwards" are also relative to an absolute reference; upwards is always against the gravity of the earth.

To the extent that explanations of certain terminology or principles of the boiler and/or steam generator arts may be necessary to understand the present disclosure, the reader is referred to *Steam/its generation and use,* 40th Edition, Stultz and Kitto, Eds., Copyright 1992, The Babcock & Wilcox Company, and to *Steam/its generation and use,* 41st Edition, Kitto and Stultz, Eds., Copyright 2005, The Babcock & Wilcox Company, the texts of which are hereby incorporated by reference as though fully set forth herein.

Figure 2:
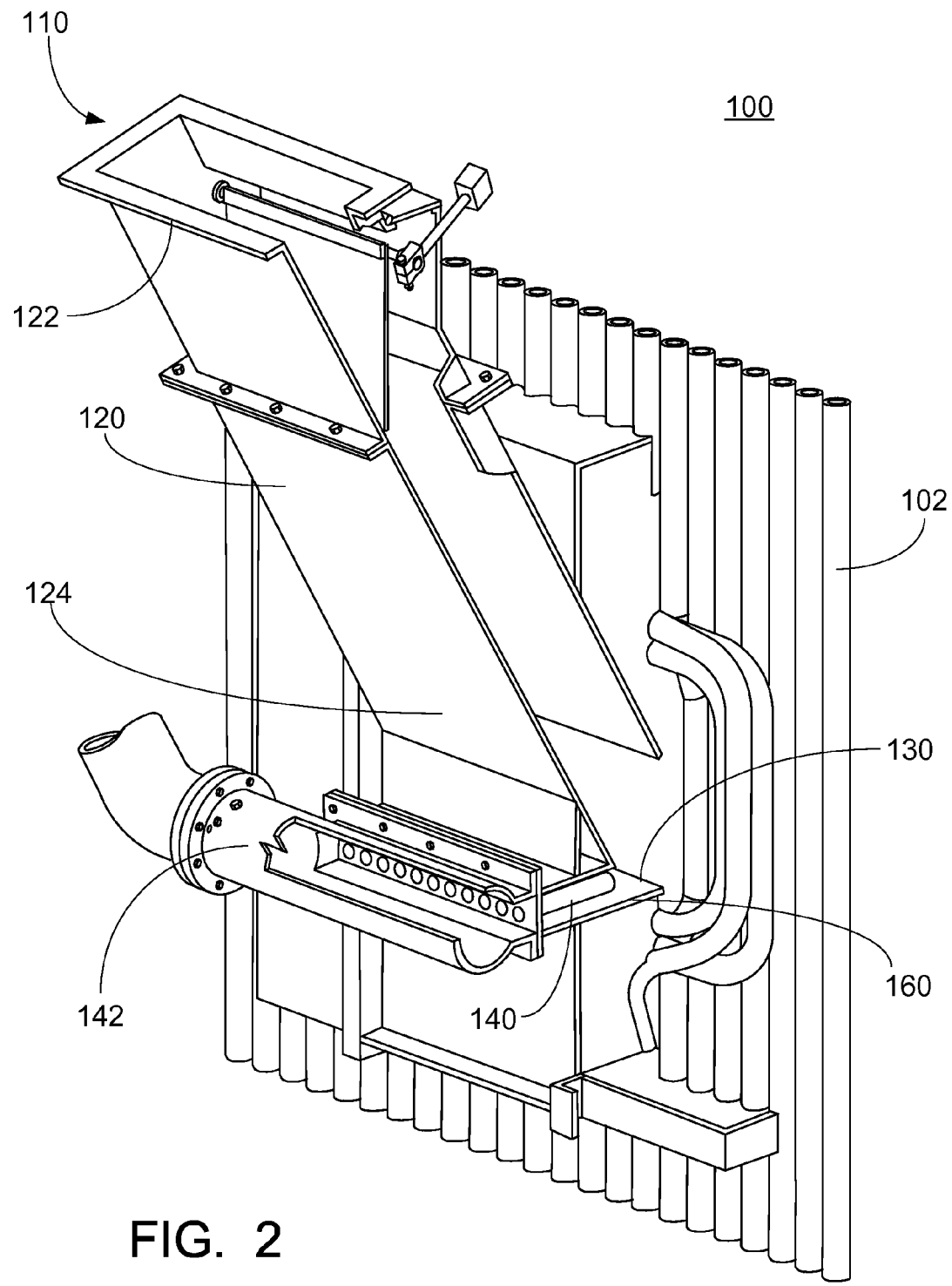
FIG. 2 diagrammatically shows a cross-sectional perspective view of a conventional solid phase fuel feeder.
Figure 3:
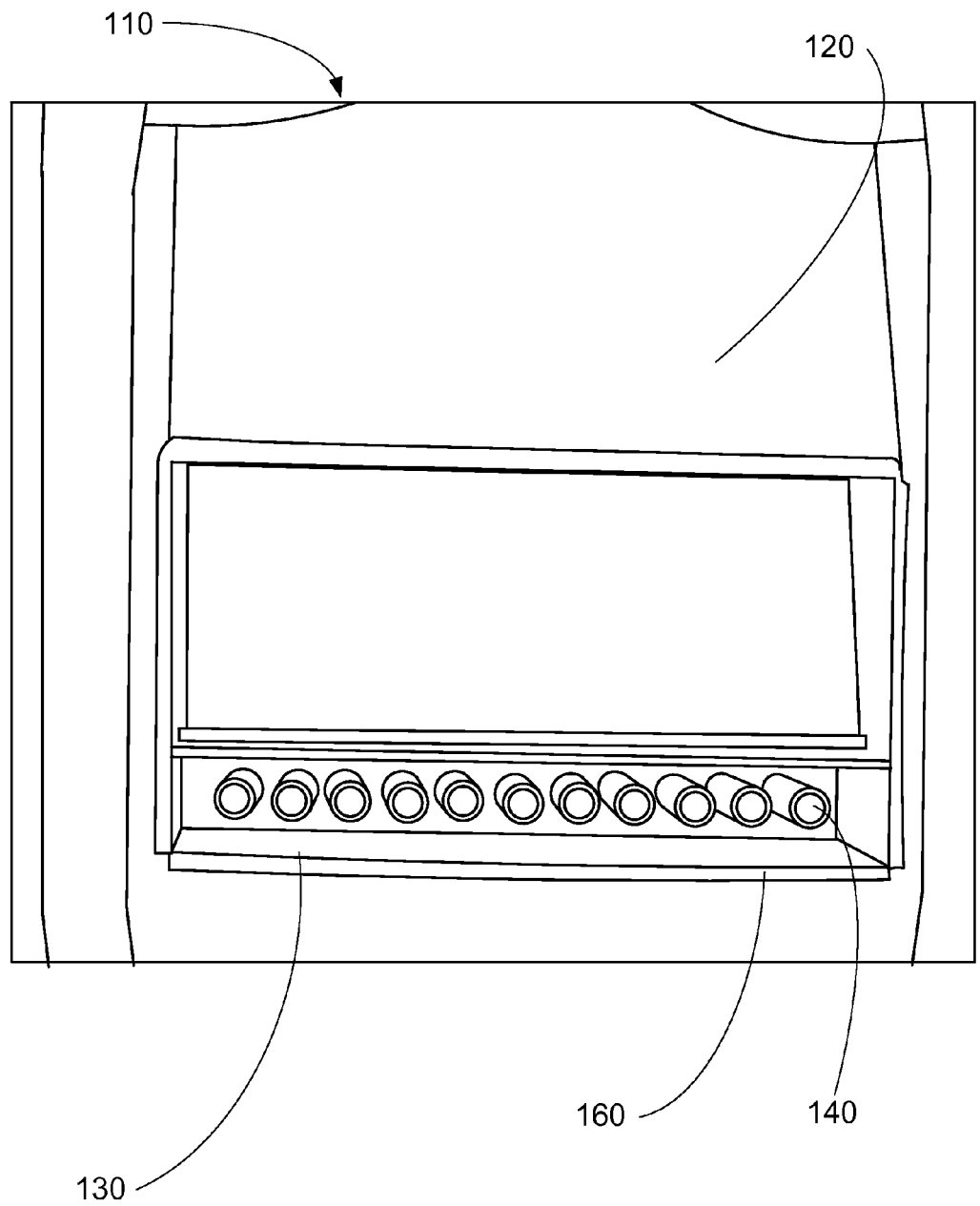
FIG. 3 diagrammatically shows the conventional fuel feeder of FIG. 2 as viewed from the inside of the boiler.

FIG. 2 shows a cross-sectional perspective illustration of a conventional solid-phase fuel feeder 110, which may for example be employed as the feeder 14 of the illustrative BFB boiler 8 of FIG. 1. The fuel feeder 110 is attached to the boiler located in a region generally designated by the reference number 100, and passes through a tube wall 102. Alternatively, the fuel feeder 110 may pass through a refractory (e.g. brick) furnace wall or other boiler wall. The fuel feeder 110 is designed for solid fuels only, and has a sloped chute 120. Solid fuel is fed into the top 122 of the chute and slides downwards at the bottom 124 of the chute into the boiler and contacts a plate 160. At the base 130 of the chute along the plate, gas distribution nozzles 140 are placed. These nozzles direct a gas, such as air, that propels and distributes the solid fuel off the plate and onto/into the fluidized bed (see FIG. 1, showing illustrative bed 10). The gas is provided to the distribution nozzles 140 through a gas supply pipe 142 that enters from the left side of the fuel feeder in the illustrative example. FIG. 3 shows a view of the fuel feeder 110 as seen from inside the boiler. The air nozzles 140 are visible at the base 130, as is the exit point of the chute and the plate 160.

With a fluidized bed boiler such as the illustrative BFB boiler 8 of FIG. 1, it is desired for the fuel to be burned within the bed, not while in suspension over the bed as it is injected into the boiler by the air stream generated by the distribution nozzles 140. This is not difficult to achieve for solid fuel, which is relatively dense and will sink relatively rapidly downwards into the bed. However, with a liquid fuel or a fine particulate fuel (which acts somewhat like a gas), it can be challenging to ensure that the fuel enters the bed.

One conventional method is to spray the liquid fuel onto the solid fuel in the fuel yard prior to feeding the solid fuel into the sloped chute 120. While suitable for small quantities (up to 10% of heat input), this method did not work well for larger quantities due to problems created in moving the wet solid fuel from the fuel yard to the boiler. Another conventional method is to inject the liquid fuel directly into the bed, typically from the floor beneath the bed. This also creates problems due to the concentration of the liquid fuel in small areas of the fluidized bed, which may cause agglomeration of the bed material. This method of injecting liquid fuel directly into the bed is limited by its low ability to evenly distribute the liquid fuel throughout the bed, as well as restricting the possible chemistry of the liquid fuel due to the poor distribution.

There is an interest in burning various biomass waste streams which are liquid-phase opportunity fuels. The ability to efficiently burn such biomass waste streams safely and economically expands the range of fuels that are usable in a fluidized bed boiler.

For example, some byproducts of ethanol production from biomass include syrup, distiller's wet grain (DWG), distiller's dry grain (DDG), and Lignin Filter Cake (LFC). The term "syrup" is synonymous with "grain stillage solubles", and typically contains 20% to 40% solids. The term "distiller's wet grain" is sometimes also referred to as "wet cake", and refers to a byproduct containing residual grain and a minimum of about 65% moisture. The term "distiller's wet grain" refers to (DWG) that has been dried to contain less than 50% moisture. The term "Lignin Filter Cake" refers to the solid waste product from the cellulosic ethanol process. The term "distiller's dry grain with solubles" (DDGS) refers to DDF and syrup combined. It is contemplated that these byproducts could be used as a fuel that can be burned in a boiler. These waste byproduct fuels are present in both solid and liquid forms.

However, ethanol waste fuel is a good example of a liquid fuel that should be burned in the fluidized bed, rather than being burned in suspension. The syrup goes through a "plastic" phase when subjected to temperatures of above 250° F. This plastic phase delays the combustion process sufficiently such that plastic phase particles in suspension have enough time to become attached to any proximate surface, leading to fouling.

Dual phase fuel feeders disclosed herein are suitably used to introduce liquid phase fuels into the fluidized bed in a predictable and controllable fashion. In the disclosed dual phase fuel feeders, a set of secondary nozzles is included in the fuel feeder, along with the distribution nozzles that inject air. These secondary nozzles are used to direct a liquid or particulate into the boiler. It is contemplated that in operation, the gas distribution nozzles of the fuel feeder will help entrain the liquid or particulate so that they contact the solid fuel and are carried into the fluidized bed along with the solid fuel. The distribution of the liquid fuel can be adjusted by altering the gas or liquid pressures, as well as by suitable design of the number and location of secondary nozzles being used. In addition, other additives or performance enhancing compounds may be introduced into the fluidized bed using the secondary nozzles. This dual phase fuel feeder can be used with a bubbling fluidized bed (BFB), a circulating fluidized bed (CFB), a stoker fired boiler, or other fluidized bed boiler.

Figure 4:
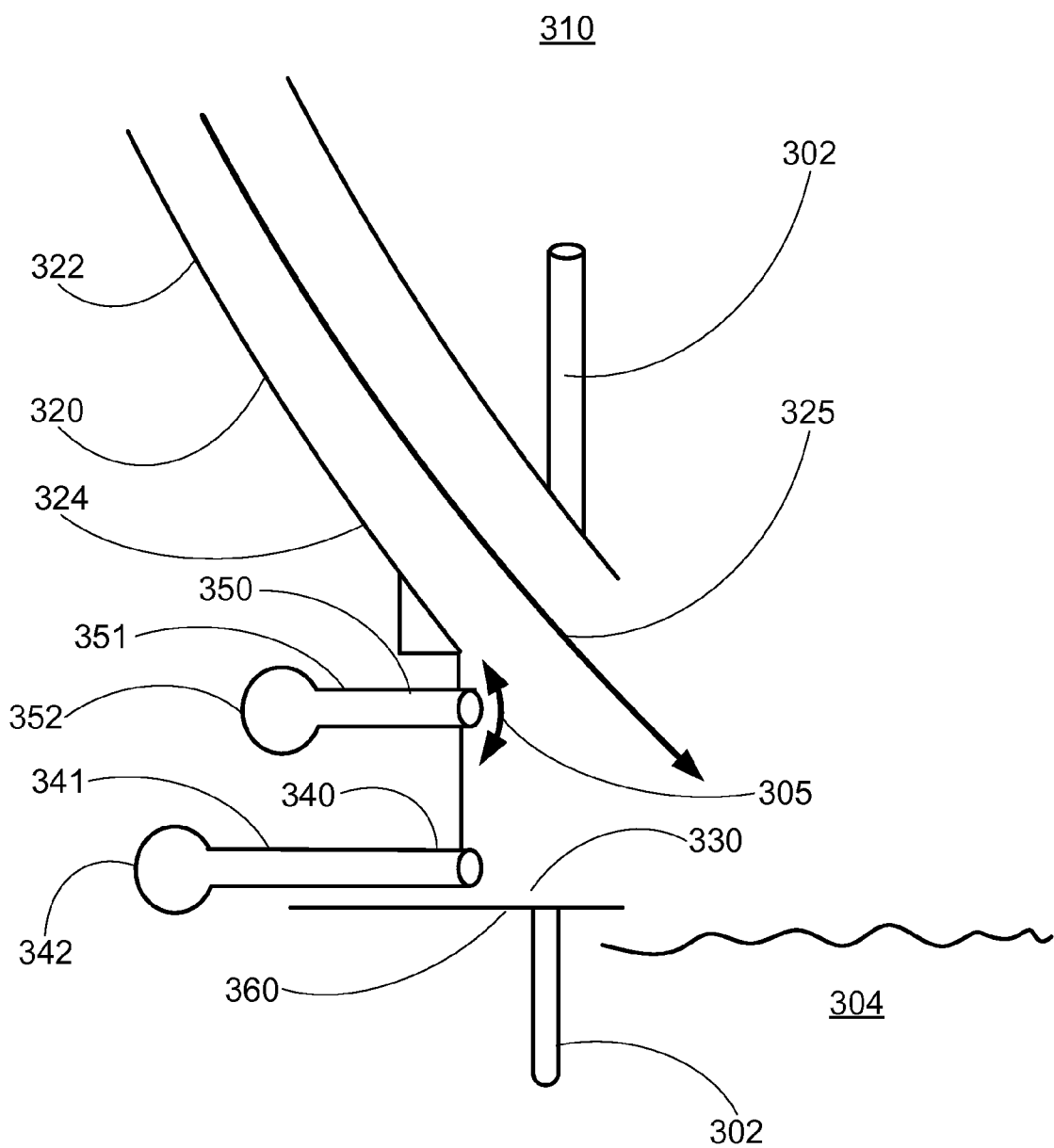
FIG. 4 diagrammatically shows a side cross-sectional view of an embodiment of a dual phase fuel feeder as disclosed herein.

With reference to FIG. 4, a first illustrative embodiment of a dual phase fuel feeder 310 is shown in side cross-sectional view, which may be suitably substituted for the conventional feeder 14 of the BFB boiler 8 of FIG. 1 in order to modify the BFB boiler 8 to use both solid and liquid fuel streams. The fuel feeder 310 passes through an opening formed in a furnace tube wall 302 which is illustrated in FIG. 4 for representational purposes with only one tube. Alternatively, the fuel feeder 310 may pass through a refractory (e.g. brick) furnace wall or other boiler wall. The fuel feeder 310 includes a sloped chute 320, a set of gas distribution nozzles 340, and a set of secondary nozzles 350. A plate 360 defines the base 330 of the fuel feeder 310. The sloped chute 320 has a top end 322 and a bottom end 324, the bottom end being proximate to the base 330 of the fuel feeder (i.e. plate). Solid fuel follows a solid feed path 325 from the top end 322 to the bottom end 324 and into the boiler. The gas distribution nozzles 340 are located at the base 330 of the fuel feeder 310 and direct a gas into the solid feed path 325. The gas is usually air, though it could also be an oxygen-enriched or oxygen-depleted gas stream. The gas injected via the gas distribution nozzles 340 is used to distribute the solid fuel fed through the chute 320 across the fluidized bed 304 (e.g., the bubbling bed 10 of the illustrative BFB boiler 8 of FIG. 1).

The secondary nozzles 350 are placed so as to direct a liquid or particulate fuel into the solid feed path 325. In the embodiment of FIG. 4, the secondary nozzles 350 are placed between the bottom end 324 of the sloped chute 320 and the gas distribution nozzles 340. As a consequence, liquid or particulate fuel injected by the secondary nozzles 350 is injected into the gas stream fed in by the gas distribution nozzles 340. It is expected that for this configuration the liquid or particulate stream injected by the secondary nozzles 350 will be entrained by the gas, causing the liquid or particulates to contact the solid fuel and be carried into the bed 304 with the solid fuel. In some embodiments, the secondary nozzles 350 comprise atomizer nozzles that atomize the liquid or particulate so as to increase the exposed surface area and accelerate the rate of combustion. In other embodiments, such as those employing ethanol as fuel, the size of the liquid droplets is preferably maximized, in which case atomizer nozzles are preferably not employed. Multiple injection points can be used to evenly distribute the liquid fuel across the solid fuel, and they can be positioned so that the solid fuel will capture any liquid particles that are small enough to remain in suspension. As further shown in FIG. 4, the gas distribution nozzles 340 are supplied by a gas supply pipe 342, and the secondary nozzles 350 are supplied by a secondary supply pipe 352. In the embodiment of FIG. 4 the supply pipes are offset from each other; as illustrated here, the lines 341 feeding the gas distribution nozzles are longer than the lines 351 feeding the secondary nozzles. Thus, the gas supply pipe and the secondary supply pipe can, if desired, be fed from the same side of the fuel feeder or be fed from opposite sides. In the embodiment of FIG. 4, the gas distribution nozzles 340 and the secondary nozzles 350 are located roughly parallel to each other. Generally, the gas and liquid exiting the nozzles exits in an expanding cone-shaped pattern, rather than in non-interacting parallel flow patterns. In some embodiments, it is contemplated that the secondary nozzles 350 are rotatable along a horizontal axis so that the angle at which the exiting liquid or particulate fuel is directed can be adjusted (e.g. to point upwards or downwards). This is diagrammatically indicated in FIG. 4 by a curved arrow 305. For example, this adjustment can be used to tilt the secondary nozzles 350 further into the gas stream of the gas distribution nozzles 340 if more interaction is desired for a given liquid or particular fuel type; or conversely the adjustment 305 can be used to tilt the secondary nozzles 350 away from the gas stream of the gas distribution nozzles 340 so their output runs more directly into the solid feed path 325 and contact the solid fuel more directly (that is, with less interaction with the gas stream).

Figure 5:
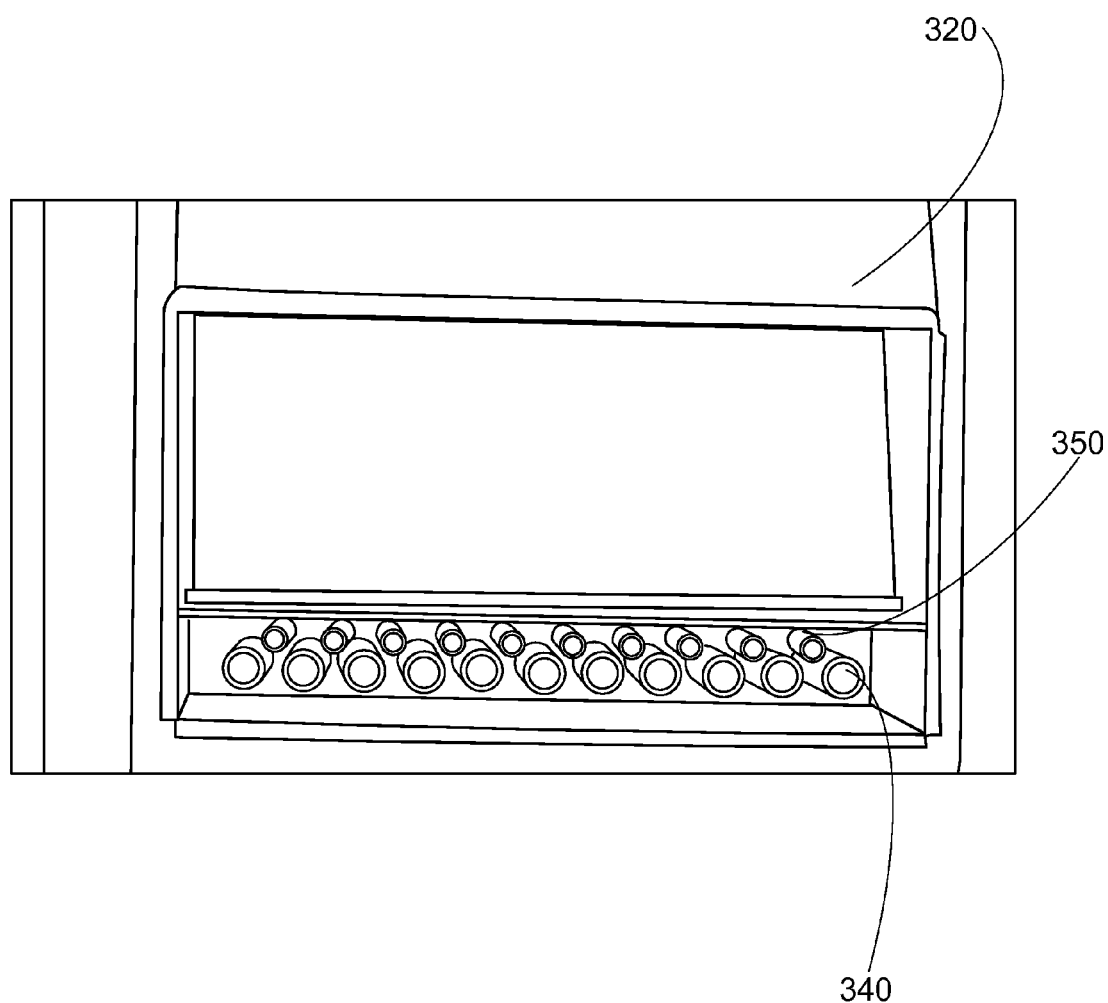
FIG. 5 diagrammatically shows the fuel feeder of FIG. 4 as viewed from inside the boiler.

FIG. 5 shows a view of the fuel feeder 310 as seen from inside the boiler (that is, a view analogous to that shown in FIG. 3 for the conventional feeder 110). FIG. 5 shows the addition of the secondary nozzles 350, which are staggered relative to the gas distribution nozzles 340. The secondary nozzles 350 are shown here in a row that is separate from the gas distribution nozzles 340, and with a secondary nozzle positioned between each pair of neighboring gas distribution nozzles.

Figure 6:
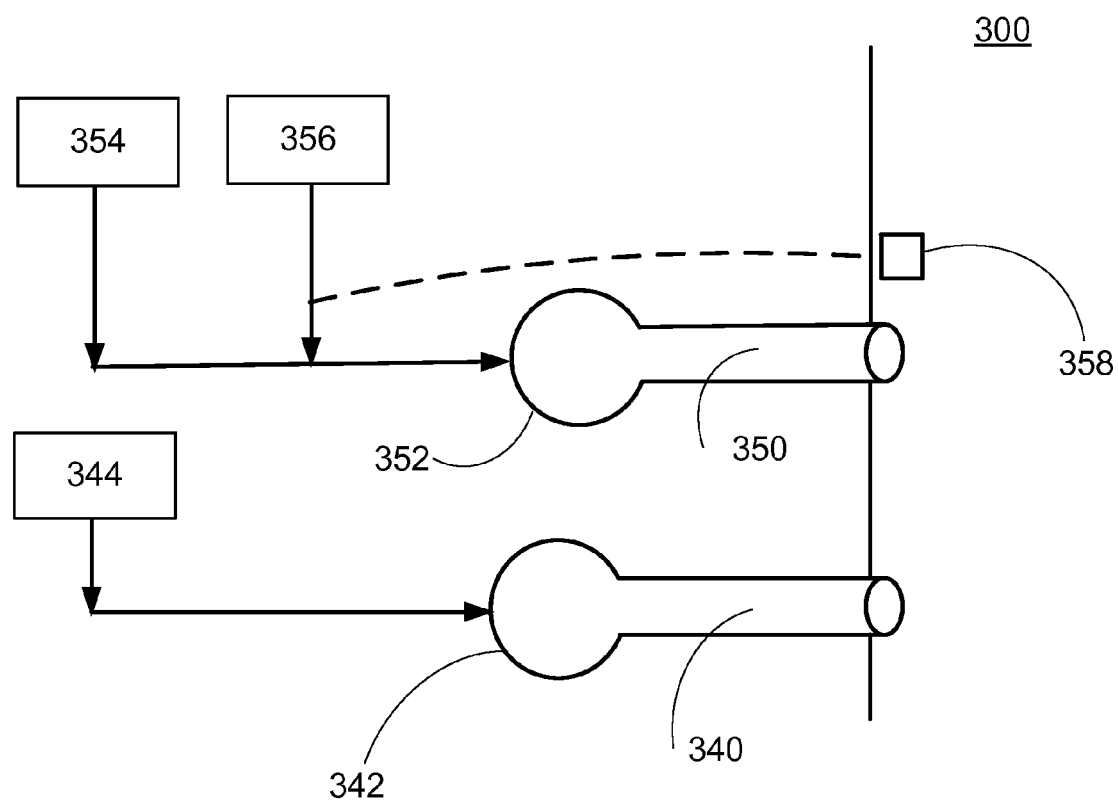
FIG. 6 shows a diagram of the boiler and the dual phase fuel feeder of FIGS. 4 and 5.

FIG. 6 diagrammatically shows certain portions of the boiler 300 with the dual phase fuel feeder 310 of FIGS. 4 and 5, including the gas supply pipe 342 feeding into the gas distribution nozzles 340 and the secondary supply pipe 352 feeding into the secondary nozzles 350. In diagrammatic FIG. 6, a gas source 344 feeds the gas supply pipe 342, which feeds into the gas distribution nozzles 340. In the illustrative embodiment of FIG. 6, the secondary supply pipe 352 is fed by two separate sources, namely a volatile liquid source 354 and a water source 356. The volatile liquid source 354 provides a liquid fuel, which may by way of illustrative example be generated by processing of a biomass material, for example during corn (or other biomass) ethanol production. It is contemplated that the fuel feeder 310 may include or be monitored by a fuel moisture sensor 358 located within the boiler 300, and control of water flow from the water source 356 into the fuel stream via the secondary supply pipe 352 and secondary nozzles 350 is contemplated to be used to wet the solid fuel to a desired moisture content, for example to reduce NOx emissions.

Figure 7:
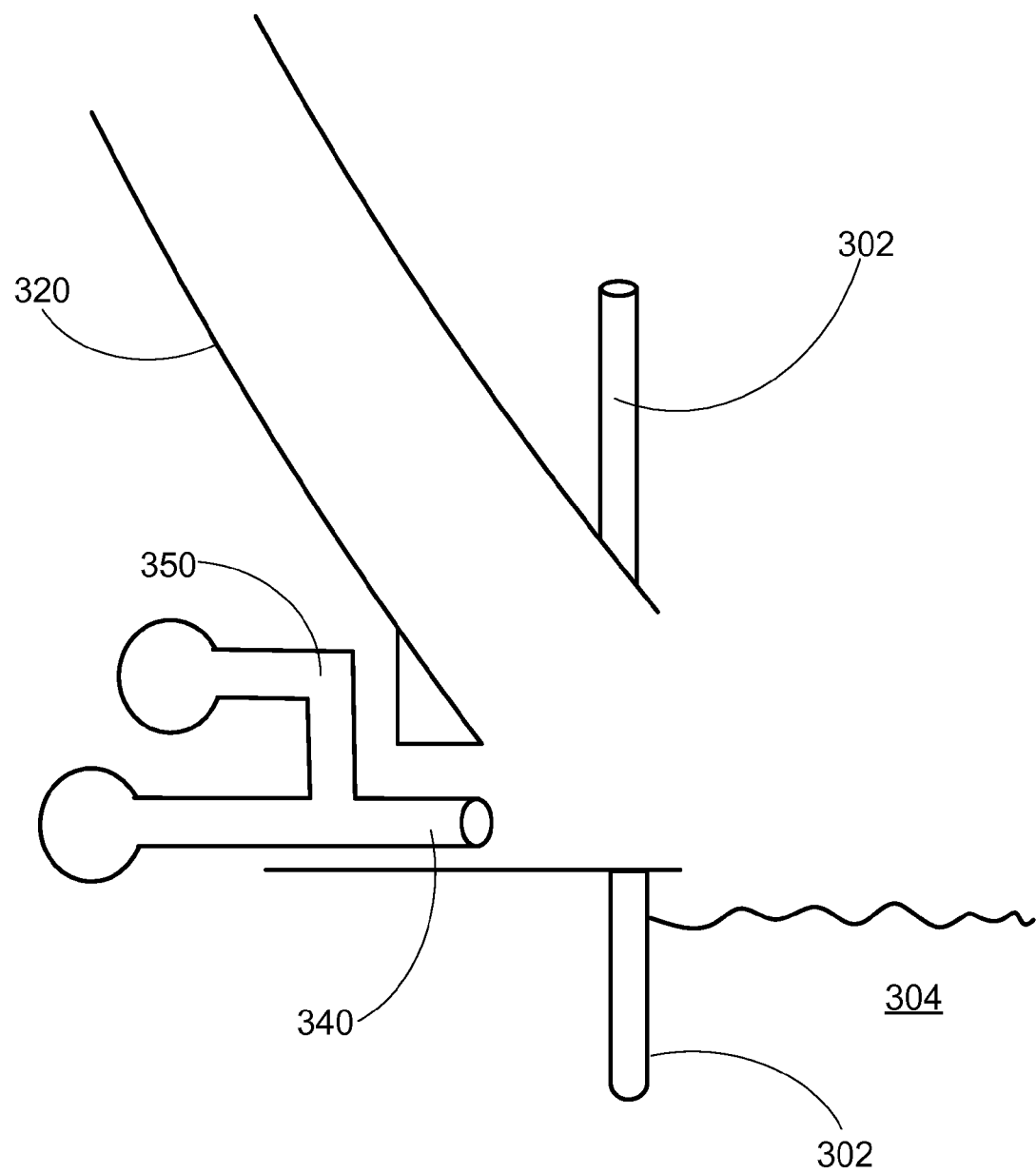
FIG. 7 diagrammatically shows a side cross-sectional view of another embodiment of a dual phase fuel feeder as disclosed herein.

FIG. 7 diagrammatically shows a side cross-sectional view of an illustrative embodiment of a dual phase fuel feeder in which the secondary nozzles 350 feed directly into the gas distribution nozzles 340. The liquid fuel is thus fed directly into the gas, which entrains the liquid and contacts the liquid with the solid fuel.

Figure 8:
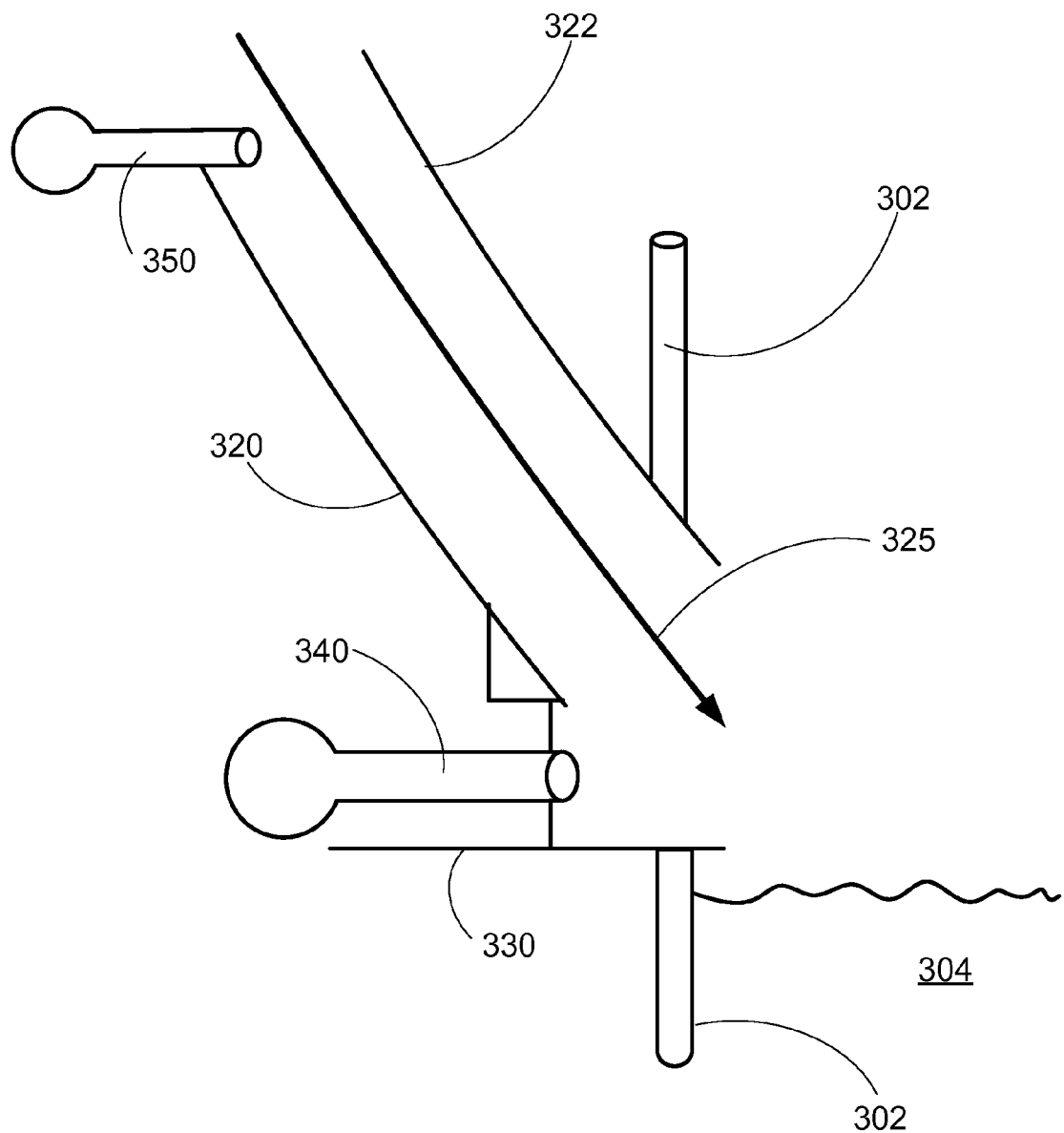
FIG. 8 diagrammatically shows a side cross-sectional view of another embodiment of a dual phase fuel feeder as disclosed herein.

FIG. 8 diagrammatically shows a side cross-sectional view of an illustrative embodiment of a dual phase fuel feeder in which the secondary nozzles 350 are proximate the top end 322 of the sloped chute 320. This embodiment places the liquid or particulate fuel from the secondary nozzles 350 into contact with the solid feed path 325 at an earlier point in the flow as compared with when the solid feed path 325 interacts with the gas output by the gas distribution nozzles 340, and is expected to facilitate fine particle carryover of the liquid fuel by the solid fuel.

Figure 9:
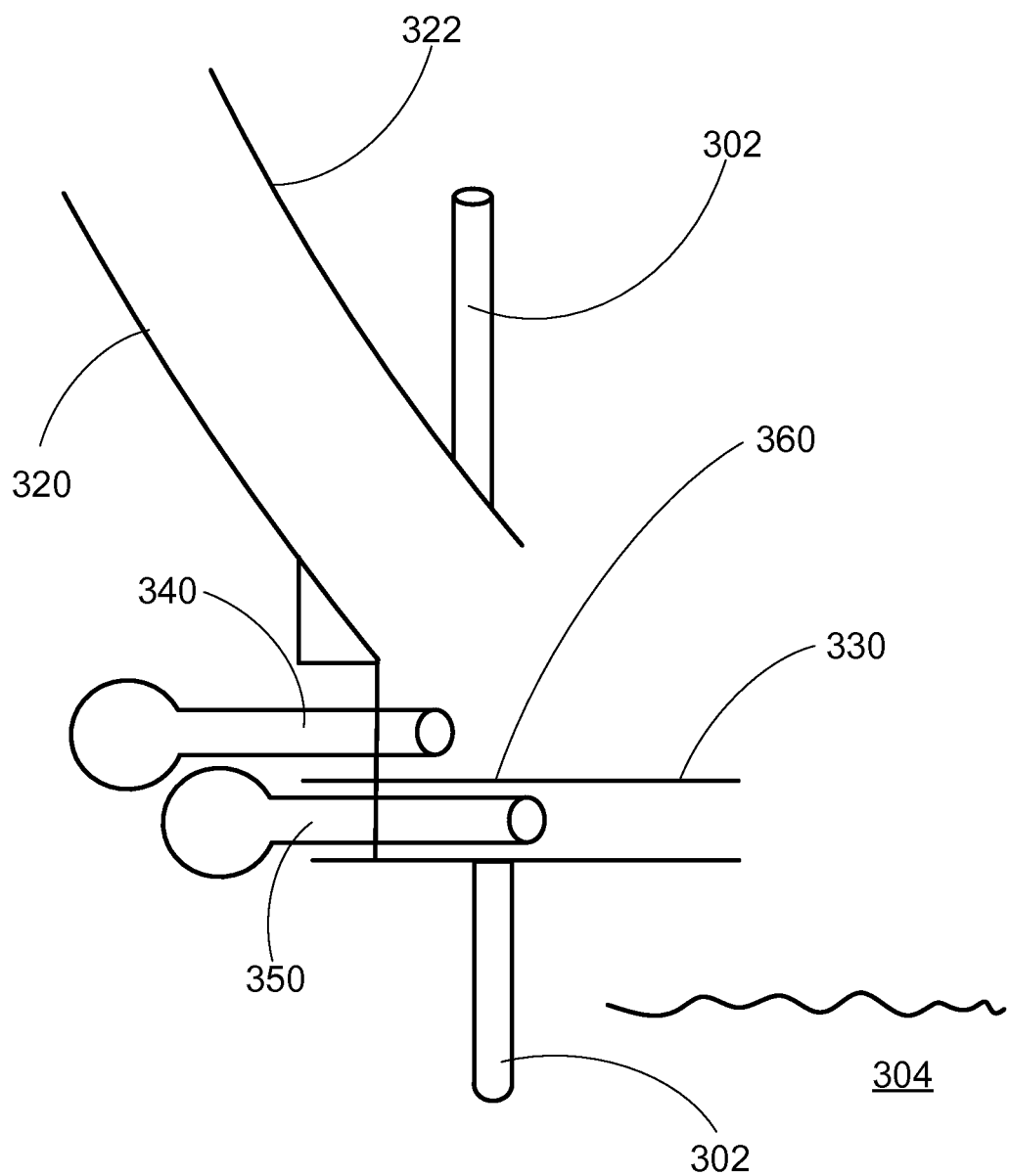
FIG. 9 diagrammatically shows a side cross-sectional view of another embodiment of a dual phase fuel feeder as disclosed herein.

FIG. 9 diagrammatically shows a side cross-sectional view of an illustrative embodiment of a dual phase feeder in which the secondary nozzles 350 are located below the base 330, so that plate 360 separates the secondary nozzles 350 from the gas distribution nozzles 340. This embodiment reduces the effect of gas injected by the gas distribution nozzles 340 on the dispersion of the liquid fuel injected by the secondary nozzles 350, and for example may be useful to reduce the potential effect of atomization of the liquid fuel by interaction with gas from the gas distribution nozzles.

The dual phase fuel feeders disclosed herein can further comprise sensors designed to aid in determining the state of the fluidized bed, the boiler, and the various fuels being fed. For example, radiation sensors, chemical sensors, thermal sensors, or acoustic sensors may be provided to detect radioactivity, particular chemical(s), combustion, and/or noise. Such sensors, if provided, are suitably used for measurement or monitoring. Another contemplated sensor is a camera used to provide visual data. FIG. 6 includes an illustrative example of such a sensor, namely the illustrative moisture sensor 358.

The secondary nozzles 350 may additionally or alternatively be used to introduce solid, gaseous or liquid reagents through the dual phase fuel feeder for emission control or other purposes. For example, limestone could be added to the bed 304 where it calcines to produce calcium oxide. Calcium oxide combines with sulfur dioxide and a half oxygen molecule to form solid calcium sulfate ($2CaO+2SO_2+O_2 \rightarrow 2CaSO_4$), removing sulfur compounds from the flue gas during the combustion process. The removal of sulfur compounds means there are less corrosive agents within the bed 304 to corrode the surfaces of the superheater. This also reduces the corrosion potential.

The temperature of the solids bed 304 and/or the flue gas within the fluidized bed boiler can be controlled by changing the distribution of fuel within the bed 304, changing the distribution of feed air within the bed (see FIG. 1, esp. the air ducts 18 and bubble caps 20), and/or controlling the amount of oxygen provided to the bed (such as by increasing the amount of oxygen-poor flue gas recycled through the bed).

The illustrative dual phase feeder embodiments of FIG. 4 or FIG. 9 are, for example, suitable for use with ethanol as the liquid fuel. The illustrative dual phase feeder embodiments of FIG. 7 or FIG. 8 are, for example, suitable for use with a relatively small amount of liquid waste fuel, or for distribution of a chemical reagent.

The number of secondary nozzles 350 in the dual phase feeder may be greater than the number needed for a given application. It is contemplated that a secondary nozzle or a group of secondary nozzles may be rotated in and out of service to combat plugging or coking. When taken out of service, the nozzle(s) may be flushed with steam and/or water to clear any buildup. In one approach, the flow is monitored and the pressure needed to achieve the desired waste fuel flow may be used to identify a nozzle or nozzle group that is becoming plugged or coked and which needs to be taken out of service for cleaning. The gas distribution nozzles 340 and/or secondary nozzles 350 can be controlled individually or as a group using suitable manifold and/or header configurations and valves to drive individual nozzles or groups of nozzles.

In some embodiments, air from the gas distribution nozzles 340 may assist in the dispersion of the liquid waste fuel injected by the secondary nozzles 350, so that restrictive dispersion devices at the end(s) of the secondary nozzle(s) (e.g. atomizer nozzles) may not be needed, thereby reducing the potential for and/or extending the time between needed nozzle cleanings. In other embodiments (see, e.g., FIG. 9), minimal interaction is provided between the liquid or particulate fuel output by the secondary nozzles 350 and the gas output by the gas distribution nozzles 340. In general, the initial position of the secondary nozzles 350 respective to the gas distribution nozzles 340 is suitably chosen or designed based on the characteristics of the waste fuel or other liquid or particulate fuel injected by the secondary nozzles 350 and the amount of dispersion desired.

As previously mentioned, in some embodiments, the angle of the secondary nozzles is adjustable (see adjustment 305 diagrammatically indicated in FIG. 4). The spray pattern may also be configured to control the suspension combustion and distribution to the fluidized bed. The optimal spray pattern/dispersion depends on the type of waste fuel. For example, if the waste fuel is a cellulosic ethanol liquid waste product, then minimal pattern/dispersion is preferably utilized.

Water and/or steam may be used to flush the secondary nozzles 350 (or a selected nozzle or set of nozzles) any time they are taken out of service. A control system (not shown) is optionally configured to automatically activate the water and/or steam flushing in the case of an emergency. In some embodiments the waste fuel valves are configured to be fail-closed and the steam and/or water valves are configured to be fail-open to assure that any loss of signal/power results in the waste fuel being taken out of service and the secondary nozzles automatically flushed.

Figure 10:
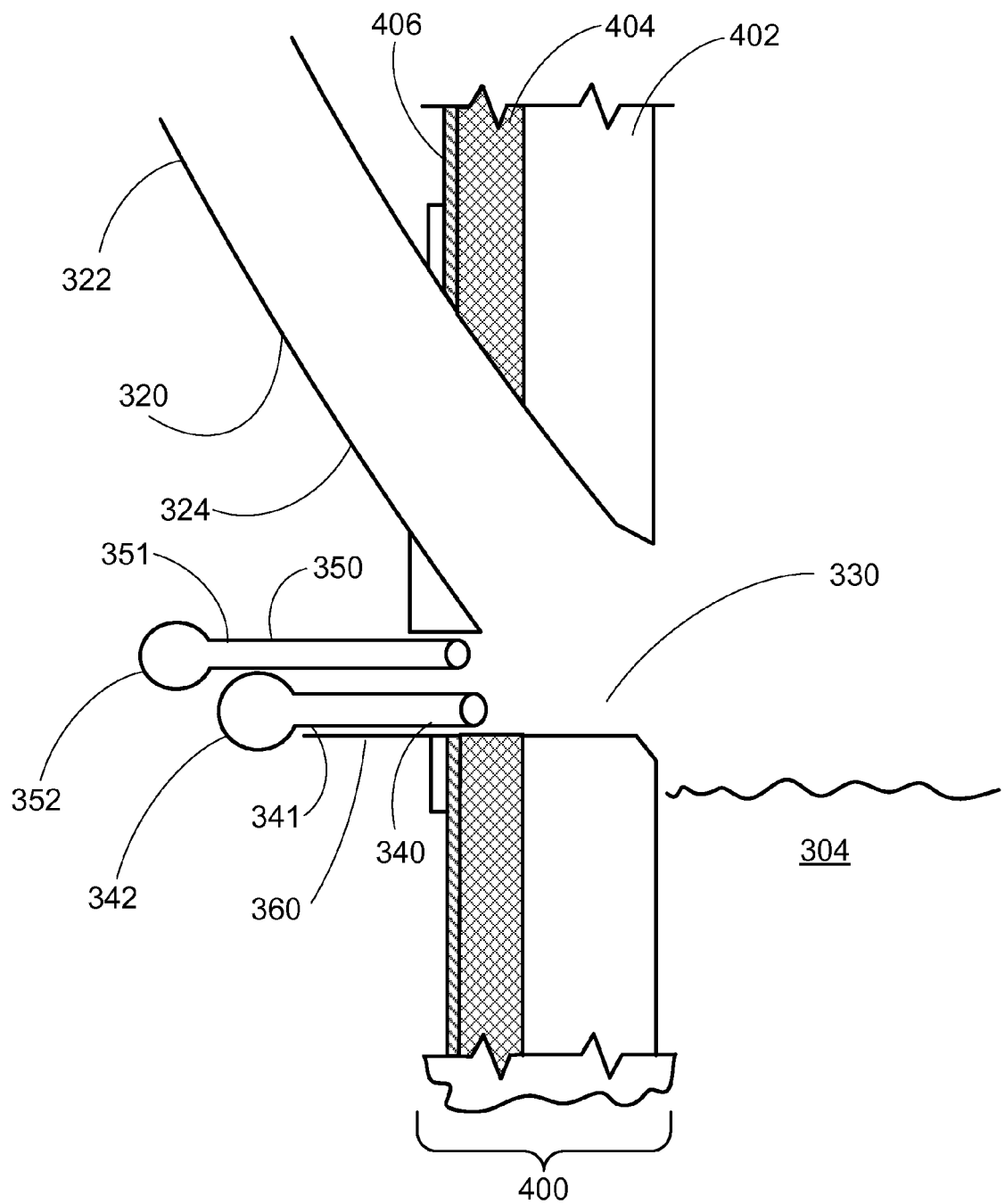
FIG. 10 diagrammatically shows a side cross-sectional view of another embodiment of a dual phase fuel feeder as disclosed herein.

With reference to FIG. 10, as previously noted the disclosed dual phase fuel feeder can be connected to any type of boiler wall. As another illustrative example, in illustrative FIG. 10 the fuel feeder of FIGS. 4 and 5 is again shown, including sloped chute 320 with top and bottom ends 322, 324, gas distribution nozzles 340 and connected lines 341 and gas pipe 342, secondary nozzles 350 and their connected lines 351 and secondary supply pipe 352, base and plate 330, 360. The fuel feeder is illustrated in FIG. 10 connected to a boiler including bed 304 as in FIG. 4. However, in FIG. 10 the fuel feeder passes through a refractory wall structure 400 comprising a refractory/brick wall 402, exterior insulation 404, and a casing 406. This is again merely an illustrative example, and more generally the disclosed dual phase fuel feeders may be used in conjunction with any type of fluidized bed boiler and may be connected to any type of boiler wall.

The present disclosure as been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

We claim:
1. An apparatus comprising:
a fuel feeder including:
a sloped chute having a base configured to connect with a boiler,
gas distribution nozzles configured to inject gas into the base with the injected gas oriented to propel solid fuel fed into the sloped chute into a boiler to which the base of the sloped chute is connected, and
secondary nozzles different from the gas distribution nozzles and configured to inject at least a fluid fuel to mix with solid fuel after the solid fuel is fed into the sloped chute.

2. The apparatus of claim 1 further comprising:
a liquid fuel source connected with the secondary nozzles to configure the secondary nozzles to inject liquid fuel to mix with solid fuel after the solid fuel is fed into the sloped chute.

3. The apparatus of claim 2 wherein the secondary nozzles comprise atomizer nozzles.

4. The apparatus of claim 1 further comprising:
a particulate fuel source connected with the secondary nozzles to configure the secondary nozzles to inject particulate fuel to mix with solid fuel after the solid fuel is fed into the sloped chute.

5. The apparatus of claim 1 further comprising:
a fuel source connected with the secondary nozzles to configure the secondary nozzles to inject fluid fuel to mix with solid fuel after the solid fuel is fed into the sloped chute, wherein the fluid fuel comprises a byproduct of ethanol production.

6. The apparatus of claim 1 wherein the secondary nozzles are arranged to inject fluid to mix with the gas injected into the base by the gas distribution nozzles.

7. The apparatus of claim 1 wherein the secondary nozzles are disposed above the gas distribution nozzles and are configured to inject fluid into the sloped chute.

8. The apparatus of claim 7 wherein the secondary nozzles are configured to inject fluid into the base of the sloped chute.

9. The apparatus of claim 1 wherein the secondary nozzles are configured to inject fluid into the gas distribution nozzles.

10. The apparatus of claim 1 wherein the secondary nozzles are disposed below the gas distribution nozzles and are configured to inject fluid into the base of the sloped chute.

11. The apparatus of claim 10 wherein the fuel feeder further includes:
a plate disposed in the base, the plate arranged to separate gas injected into the base of the sloped chute by the gas distribution nozzles from fluid injected into the base of the sloped chute by the secondary nozzles.

12. The apparatus of claim 1 wherein:
the gas distribution nozzles are configured to inject gas into the base with the injected gas oriented horizontally to propel solid fuel fed into the sloped chute into a boiler to which the base of the sloped chute is connected; and
the secondary nozzles are disposed above the gas distribution nozzles and are configured to inject fluid into the sloped chute.

13. The apparatus of claim 1 wherein:
The gas distribution nozzles are configured to inject gas into the base with the injected gas oriented horizontally to propel solid fuel fed into the sloped chute into a boiler to which the base of the sloped chute is connected; and
the secondary nozzles are disposed below the gas distribution nozzles and are configured to inject fluid into the sloped chute.

14. The apparatus of claim 1 further comprising:
a fluidized-bed boiler to which the base of the sloped chute of the fuel feeder is connected, the fluidized-bed boiler including a bed onto which the connected fuel feeder is configured to dispose solid fuel that is fed into the sloped chute and mixed with fluid injected by the secondary nozzles.

15. A method comprising:
feeding solid fuel into a sloped chute connected with a boiler;
concurrently with the feeding, injecting a propulsion gas into a base of the sloped chute to propel the solid fuel fed into the sloped chute over a bed of the boiler; and
concurrently with the feeding and the injecting of the propulsion gas, injecting at least a fluid fuel which is different from the propulsion gas to mix the at least a fluid fuel with the solid fuel after the solid fuel is fed into the sloped chute.

16. The method of claim 15 wherein the injecting of the second fluid comprises:
injecting the at least a fluid fuel into the sloped chute to mix the second fluid with the solid fuel after the solid fuel is fed into the sloped chute.

17. The method of claim 16 wherein the second fluid is injected into the sloped chute upstream of the propulsion gas along the sloped chute.

18. The method of claim 16 wherein the at least a fluid fuel is injected into the sloped chute downstream of the propulsion gas along the sloped chute.

19. The method of claim 15 wherein the injecting of the at least a fluid fuel comprises:
injecting the at least a fluid fuel into gas distribution nozzles used to perform the injecting of the propulsion gas.

20. The method of claim 15 wherein the at least a fluid fuel comprises a liquid or particulate fuel.

21. The method of claim 15 wherein the at least a fluid fuel comprises a liquid fuel and the injecting of the at least a fluid fuel includes atomizing the liquid fuel as it is injected.

22. The method of claim 15 wherein the at least a fluid fuel comprises a byproduct of ethanol production.

23. The method of claim 15 wherein the injecting of the propulsion gas and the injecting of the at least a fluid fuel cooperatively operate to mix the propulsion gas and the at least a fluid fuel.

24. The method of claim 15 further comprising:
operating the boiler to combust the solid fuel that is fed into the sloped chute, mixed with the second fluid and propelled over the bed of the boiler by the injected propulsion gas.

25. The method of claim 24 wherein the operating of the boiler also combusts the at least a fluid fuel mixed with the solid fuel that is propelled over the bed of the boiler.

26. A dual phase fuel feeder, comprising:
a sloped chute having a top end and a bottom end, the bottom end being proximate to a base of the fuel feeder, the chute defining a solid feed path;
gas distribution nozzles located at the base of the fuel feeder for directing a gas into the solid feed path; and
secondary nozzles placed so as to be able to direct a at least a liquid fuel and at least gas and/or particulate into the solid feed path.

27. The fuel feeder of claim 26, wherein the secondary nozzles are placed between the bottom end of the sloped chute and the gas distribution nozzles.

28. The fuel feeder of claim 26, wherein a plate defines the base of the fuel feeder.

29. The fuel feeder of claim 28, wherein the plate is located between the gas distribution nozzles and the secondary nozzles.

30. The fuel feeder of claim 26, wherein the secondary nozzles are rotatable so that the angle at which the liquid or particulate is directed can be changed.

31. The fuel feeder of claim 26, wherein the secondary nozzles feed into the gas distribution nozzles.

32. The fuel feeder of claim 26, wherein the secondary nozzles are located proximate the top end of the sloped chute.

33. The fuel feeder of claim 26, wherein the secondary nozzles can be fed separately by a volatile liquid source and by a water source.

34. The fuel feeder of claim 33, wherein the secondary nozzles are tied to a fuel moisture sensor.

35. The fuel feeder of claim 26, wherein the secondary nozzles are arranged in a staggered pattern relative to the gas distribution nozzles.

* * * * *